(12) United States Patent
Liu et al.

(10) Patent No.: US 9,298,673 B2
(45) Date of Patent: Mar. 29, 2016

(54) ELECTRONIC DEVICE AND INFORMATION PROCESSING METHOD

(71) Applicant: Lenovo (Beijing) Limited, Beijing (CN)

(72) Inventors: Huaping Liu, Beijing (CN); Wei Xie, Beijing (CN)

(73) Assignee: Lenovo (Beijing) Limited (CN)

( * ) Notice: Subject to any disclaimer, the term of this patent is extended or adjusted under 35 U.S.C. 154(b) by 0 days.

(21) Appl. No.: 14/499,791

(22) Filed: Sep. 29, 2014

(65) Prior Publication Data

US 2015/0163518 A1 Jun. 11, 2015

(30) Foreign Application Priority Data

Dec. 10, 2013 (CN) .......................... 2013 1 0680499

(51) Int. Cl.
*G06F 15/80* (2006.01)
(52) U.S. Cl.
CPC .................................. *G06F 15/8061* (2013.01)
(58) Field of Classification Search
CPC ..... H04N 19/85; H04N 19/44; H04N 19/184; H04N 19/186; H04N 5/378; H04N 7/12; G06F 17/30244; G06F 9/3885; G06F 13/4018; G06F 15/8061; G11C 7/1045
See application file for complete search history.

(56) References Cited

U.S. PATENT DOCUMENTS

| | | | | |
|---|---|---|---|---|
| 5,724,602 | A * | 3/1998 | Tanaka et al. | 712/32 |
| 6,195,741 | B1 * | 2/2001 | Asato | 712/24 |
| 6,405,273 | B1 * | 6/2002 | Fleck et al. | 710/310 |
| 7,181,629 | B1 * | 2/2007 | Hatanaka et al. | 713/194 |
| 2002/0059488 | A1 * | 5/2002 | Ishida et al. | 710/65 |
| 2002/0166008 | A1 * | 11/2002 | Tanaka et al. | 710/56 |
| 2006/0203847 | A1 * | 9/2006 | Toyoda | 370/468 |
| 2006/0290983 | A1 * | 12/2006 | Takeda et al. | 358/1.16 |
| 2008/0052497 | A1 * | 2/2008 | Sueyoshi et al. | 712/221 |
| 2010/0091989 | A1 * | 4/2010 | Yamashita | 380/212 |
| 2010/0328118 | A1 * | 12/2010 | Koyanagi | 341/101 |
| 2013/0301648 | A1 * | 11/2013 | Yamashita | 370/431 |
| 2015/0117504 | A1 * | 4/2015 | Harriman et al. | 375/224 |

* cited by examiner

*Primary Examiner* — Jingge Wu
(74) *Attorney, Agent, or Firm* — Schwegman Lundberg & Woessner, P.A.

(57) ABSTRACT

The present disclosure provides an electronic device and an information processing method. The electronic device comprises: a processor which comprises N processing units to process data and perform data input and output; a data processing interface coupled to Q processing units among the N processing units, which compresses raw data received from the Q processing units to obtain compressed data; and a memory coupled to the data processing interface, which receives and stores the compressed data, where $N \geq 1$ and $1 \leq Q \leq N$.

14 Claims, 2 Drawing Sheets

ELECTRONIC DEVICE AND INFORMATION PROCESSING METHOD

CROSS-REFERENCE TO RELATED APPLICATION(S)

This application claims priority to Chinese Application No. 201310680499.0, entitled "ELECTRONIC DEVICE AND INFORMATION PROCESSING METHOD", filed on Dec. 10, 2013, which is incorporated herein by reference in their entirety.

TECHNICAL FIELD

The present disclosure relates to electronic technology, and more particularly, to an electronic device and an information processing method.

BACKGROUND

It is popular to design application processor by utilizing on-chip systems which are integrated techniques of system firmware and circuits based on IP modules. Here, the IP modules include an image codec module, a video codec module, an image processing unit, and the like. With the increasing of data exchanges between various IP modules and storage units outside the chip, the power consumption and the cost of the chip increase.

Due to the user's requirement on electronic devices with low power consumptions, it is important for application processor design to reduce the amount of data exchange. It has been proposed to compress the data to be exchanged in accordance with a particular format within various IP modules and then transmit the compressed data of the particular format to the memory.

However, during implementation of the solutions according to the embodiments of the present disclosure, the inventors have found that: in order to compress the data to be exchanged in accordance with a particular format, the conventional technologies need complicated processing applied to IP modules, which requires IP module manufactures to do extra and complicated modification on IP modules. Hence, the conventional solutions are not applicable.

Therefore, there is a problem with the conventional solutions that no uniform compression scheme can be provided for data transmission by the IP modules so as to improve the bandwidth utilization between the IP modules and the storage unit and thus reduce the power consumption.

SUMMARY

In an aspect, an electronic device is provided according to an embodiment of the present disclosure. The electronic device comprises: a processor which comprises N processing units to process data and perform data input and output; a data processing interface coupled to Q processing units among the N processing units, which compresses raw data received from the Q processing units to obtain compressed data, where $1 \leq Q \leq N$; and a memory coupled to the data processing interface, which receives and stores the compressed data.

Optionally, the N processing units comprise at least an image processing unit, a video processing unit and/or a display processing unit.

Optionally, the data processing interface has a read/write bit width of M bits.

Optionally, the data processing interface further receives M bits of raw data outputted sequentially from the Q processing units and compresses the M bits of raw data sequentially in accordance with a predetermined compression scheme, obtains an i-th compressed data and a compression indicator associated with the compression scheme for the i-th compressed data, determines whether the compressed data has reached M bits, obtains an (i+1)-th compressed data associated with next M bits of raw data outputted sequentially from the Q processing units in the case that the compressed data has not reached M bits, combines the compressed data sequentially until the combined compressed data reaches M bits, and outputs the combined compressed data to the memory.

Optionally, the data processing interface further determines whether the compression indicator has reached M bits, obtains a next compression indicator associated with next M bits of raw data outputted sequentially from the Q processing units in the case that the compression indicator has not reached M bits, combines the obtained compression indicator and the next compression indicator sequentially until the combined compression indicator reaches M bits, and outputs the combined compression indicator to the memory.

Optionally, the data processing interface further receives a read data request outputted from the Q processing units for reading M bits of raw data, and obtains a combined compression indicator associated with the M bits of raw data and outputs the combined compression indicator to the memory.

Optionally, the memory comprises at least one memory controller to: determine the compressed data associated with the M bits of raw data according to the combined compression indicator associated with the M bits of raw data; and output the compressed data associated with the M bits of raw data to the data processing interface.

Optionally, the data processing interface further receives and decompresses the compressed data associated with the M bits of raw data to obtain raw data associated with the M bits of raw data, and outputs the raw data associated with the M bits of raw data to the Q processing units.

In another aspect, an information processing method is provided according to an embodiment of the present disclosure. The method comprises: outputting, by Q processing units among N processing units, raw data to a data processing interface; receiving, by the data processing interface, and sequentially compressing the raw data in accordance with a predetermined scheme to obtain compressed data; outputting, by the data processing interface, the compressed data to a memory; and storing the compressed data in the memory.

Optionally, the N processing units comprise at least an image processing unit, a video processing unit and/or a display processing unit.

Optionally, the data processing interface has a read/write bit width of M bits.

Optionally, said sequentially compressing the raw data in accordance with the predetermined scheme comprises: receiving, by the data processing interface, M bits of raw data outputted sequentially from the Q processing units and compressing the M bits of raw data sequentially in accordance with a predetermined compression scheme to obtain the i-th compressed data and a compression indicator associated with the compression scheme for the i-th compressed data; determining, by the data processing interface, whether the compressed data has reached M bits; obtaining, by the data processing interface, the (i+1)-th compressed data associated with next M bits of raw data outputted sequentially from the Q processing units in the case that the compressed data has not reached M bits; obtaining, by the data processing interface, the compressed data sequentially until the combined compressed data reaches M bits; and outputting, by the data processing interface, the combined compressed data to the memory.

Optionally, the method further comprises, subsequent to said sequentially compressing the raw data in accordance with the predetermined scheme: determining, by the data processing interface, whether the compression indicator has reached M bits; obtaining, by the data processing interface, a next compression indicator associated with next M bits of raw data outputted sequentially from the Q processing units in the case that the compression indicator has not reached M bits; combining, by the data processing interface, the obtained compression indicator and the next compression indicator sequentially until the combined compression indicator reaches M bits; and outputting, by the data processing interface, the combined compression indicator to the memory.

Optionally, the method further comprises, subsequent to said storing the compressed data in the memory: receiving, by the data processing interface, a read data request outputted from the Q processing units for reading M bits of raw data; obtaining, by the data processing interface, a combined compression indicator associated with the M bits of raw data, and outputting the combined compression indicator to the memory.

Optionally, the method further comprises, subsequent to said obtaining and outputting the combined compression indicator to the memory: determining, by at least one memory controller of the memory, the compressed data associated with the M bits of raw data according to the combined compression indicator associated with the M bits of raw data; and outputting, by the at least one memory controller, the compressed data associated with the M bits of raw data to the data processing interface.

Optionally, the method further comprises, subsequent to said outputting the compressed data associated with the M bits of raw data to the data processing interface: receiving and decompressing, by the data processing interface, the compressed data associated with the M bits of raw data to obtain raw data associated with the M bits of raw data; and outputting, by the data processing interface, the raw data associated with the M bits of raw data to the Q processing units.

DETAILED DESCRIPTION OF THE EMBODIMENTS

An electronic device is provided according to an embodiment of the present disclosure. The electronic device comprises a processor comprising N processing units capable of processing data and performing data input and output operations, where $N \geq 1$. The electronic device further comprises a data processing interface coupled to Q processing units among the N processing units and capable of compressing received raw data in the Q processing units to obtain compressed data, where $1 \leq Q \leq N$. The electronic device further comprises a memory coupled to the data processing interface and configured to receive and store the compressed data. The electronic device is capable of reducing the amount of data exchanged between the processor and the memory outside the processor and the memory. Hence, it is possible to effectively solve the problem with the conventional solutions that no electronic device can reduce the amount of data exchanged between an IP module and a storage unit outside the IP module and the storage unit by providing an electronic device capable of reducing the amount of data exchanged between an IP module and a storage unit outside the IP module and the storage unit. In this way, the power consumption and the cost of the electronic device can be reduced and the performance of the electronic device can be improved.

In the following, the above solution will be described in detail with reference to the figures and embodiments such that the above solution can be better understood.

$1^{st}$ Embodiment

Figure 1:
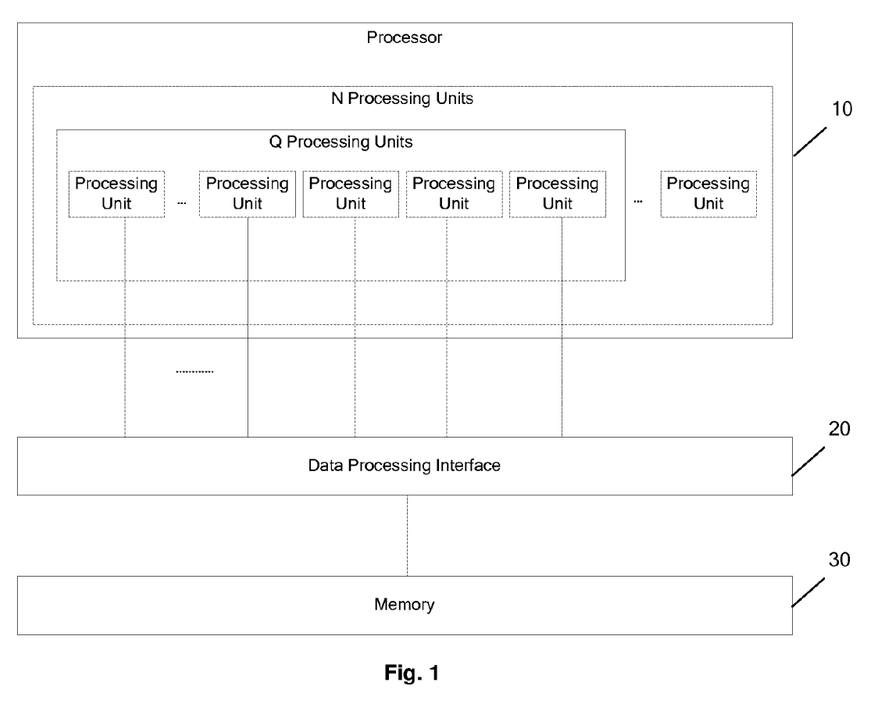
FIG. 1 is a block diagram of an electronic device according to a first embodiment of the present disclosure.

As shown in FIG. 1, according to an embodiment of the present disclosure, an electronic device is provided.

The electronic device includes a processor 10 including N processing units capable of processing data and performing data input and output operations, where $N \geq 1$.

The electronic device further includes a data processing interface 20 coupled to Q processing units among the N processing units and capable of compressing received raw data in the Q processing units to obtain compressed data, where $1 \leq Q \leq N$.

The electronic device further includes a memory 30 coupled to the data processing interface and configured to receive and store the compressed data.

The processor 10, the data processing interface 20 and the memory 30 will be detailed first.

In an embodiment of the present disclosure, the processor 10 can be an on-chip system. The N processing units included in the processor 10 may include an image processing unit, a video processing unit, an audio processing unit, a display processing unit or the like. The Q processing units among the N processing units may include an image processing unit, a video processing unit and/or a display processing unit. It can be appreciated by those skilled in the art that the processor, the N processing units included in the processor and the Q processing units among the N processing units described here are exemplary only. The present disclosure is not limited to these examples. Rather, any other processors capable of processing data and performing data input and output operations can be used in the present disclosure.

In an embodiment of the present disclosure, the Q processing units are coupled to the data processing interface 20 and configured to output raw data to the data processing interface. The raw data is continuous in the sense that it generally varies little within a certain space.

In an embodiment of the present disclosure, the data processing interface 20 is coupled to the Q processing units and the memory 30. The data processing interface 20 has a read/write bit width of M bits. That is, the data processing interface 20 is capable of receiving M bits of raw data transmitted from the Q processing units at a time and outputting M bits of combined compressed data to the memory 30 at a time.

In an embodiment of the present disclosure, the memory 30 is coupled to the data processing interface 20. The memory 30 includes at least one memory controller. The memory 30 receives and stores M bits of combined compressed data outputted from the data processing interface 20.

Next, the process in which the data processing interface 20 compresses the raw data in the Q processing units will be explained in detail.

At the first step, M bits of raw data outputted sequentially from the Q processing units are obtained and the M bits of raw data are compressed sequentially in accordance with a predetermined compression scheme to obtain compressed data and a compression indicator associated with the predetermined compression scheme.

At the second step, it is determined whether the compressed data has reached M bits.

At the third step, in the case that the compressed data has not reached M bits, next compressed data associated with next M bits of raw data outputted sequentially from the Q processing units is obtained.

At the fourth step, the obtained compressed data including the compressed data and the next compressed data are combined sequentially until the combined compressed data reaches M bits.

At the fifth step, the combined compressed data is outputted to the memory.

At the sixth step, it is determined whether the compression indicator has reached M bits.

At the seventh step, in the case that the compression indicator has not reached M bits, a next compression indicator associated with next M bits of raw data outputted sequentially from the Q processing units is obtained.

At the eighth step, the obtained compression indicator including the compression indicator and the next compression indicator are combined sequentially until the combined compression indicator reaches M bits.

At the ninth step, the combined compression indicator is outputted to the memory.

In an implementation, the data processing interface receives M bits of raw data outputted sequentially from the Q processing units. Here, M is the read/write bit width of the data processing interface, which can be 128, 256, 512 or any other integral power of 2. In the following, M is assumed to be 128 as an example.

Upon receiving 128 bits of raw data outputted from the Q processing units, the data processing interface compresses the 128 bits of raw data in accordance with a predetermined scheme. Here, the predetermined compression scheme includes at least the following four schemes.

With the first compression scheme, the 128 bits of data cannot be compressed and the resulting compressed data is still 128 bits. Assuming that the compression indicator has 2 bits, the compression indicator for the first compression scheme is 00.

With the second compression scheme, the 128 bits of data can be compressed into 64 bits of compressed data. The associated compression indicator is 01.

With the third compression scheme, the 128 bits of data can be compressed into 32 bits of compressed data. The associated compression indicator is 10.

With the fourth compression scheme, the 128 bits of data can be compressed into 16 bits of compressed data. The associated compression indicator is 11.

The above compression schemes for compressing the 128 bits of raw data are exemplary only. In practice, the 128 bits can be compressed into 8, 4, 2 or 1 bit of compressed data and the description thereof will be omitted here. It can be appreciated by those skilled in the art that, when M is an n-th power of 2, where n is a positive integer, there will be n+1 compression schemes for M bits of raw data, including the situation in which the M bits of raw data cannot be compressed.

In an embodiment of the present disclosure, compression indicators are used to represent different compression schemes and distinguish them from each other. While a 2-bit compression indicator is used in the above example, in practice the number of bits occupied by a compression indicator can be determined as desired and the present disclosure is not limited thereto.

After the first step for obtaining the compressed data and the compression indicator, the process proceeds with the second step for determining whether the compressed data has reached 128 bits.

If in the first step the 128 bits of raw data cannot be compressed and the resulting compressed data is still 128 bits, then it is determined in the second step that the compressed data has reached 128 bits. In this case, the resulting compressed data will be directly outputted to the memory.

If in the first step the 128 bits of raw data has been compressed into 64 bits of compressed data, then it is determined in the second step that the compressed data has not reached 128 bits. In this case, the process proceeds with the following steps.

At the third step, in the case that the compressed data has not reached M bits, next compressed data associated with next M bits of raw data outputted sequentially from the Q processing units is obtained.

At the fourth step, the obtained compressed data including the compressed data and the next compressed data are combined sequentially until the combined compressed data reaches M bits.

At the fifth step, the combined compressed data is outputted to the memory.

Assuming that the obtained next compressed data includes 64 bits, the obtained compressed data, i.e., the 64 bits of compressed data obtained in the first step is combined with the obtained next 64 bits of compressed data, resulting in a combined compressed data of 64+64=128 bits. Then, the combined 128 bits of compressed data are outputted to the memory.

Assuming that the obtained next compressed data includes 32 bits, the obtained compressed data, i.e., the 64 bits of compressed data obtained in the first step is combined with the obtained next 32 bits of compressed data, resulting in a combined compressed data of 64+32<128 bits. Assuming that the obtained next compressed data includes 32 bits, the obtained 64+32 bits of compressed data are combined with the obtained next 32 bits of compressed data, resulting in a combined compressed data of (64+32)+32=128 bits. Then, the combined 128 bits of compressed data are outputted to the memory.

Assuming that the obtained next compressed data includes 16 bits, the obtained compressed data, i.e., the 64 bits of compressed data obtained in the first step is combined with the obtained next 16 bits of compressed data, resulting in a combined compressed data of 64+16<128 bits. Assuming that the obtained next compressed data includes 32 bits, the obtained 64+16 bits of compressed data are combined with the obtained next 32 bits of compressed data, resulting in a combined compressed data of (64+16)+32<128 bits. Assuming that the obtained next compressed data includes 16 bits, the obtained 64+16+32 bits of compressed data are combined with the obtained next 16 bits of compressed data, resulting in a combined compressed data of (64+16+32)+16=128 bits. Then, the combined 128 bits of compressed data are outputted to the memory.

Three examples have been described above regarding how the data processing interface compresses the 128 bits of raw data in accordance with different compression schemes and outputs the compressed data to the memory. In fact, the present disclosure is not limited to the combination of the above three compression schemes. Rather, any compression schemes capable of compressing the data and allowing the compressed data to be combined to result in a combined compressed data equal to the bit width of the data processing interface can be used with the present disclosure.

Subsequent to the fifth step, the data processing interface proceeds with the sixth step for determining whether the compression indicator has reached M bits.

After the first step, the compressed data and the compression indicator have been obtained. Here, it is assumed that compression indicator has 2 bits. In this case, it is determined in the sixth step that the compression indicator has not reached 128 bits. Accordingly, the process proceeds with the following steps.

At the seventh step, in the case that the compression indicator has not reached M bits, a next compression indicator associated with next M bits of raw data outputted sequentially from the Q processing units is obtained.

At the eighth step, the obtained compression indicator including the compression indicator and the next compression indicator are combined sequentially until the combined compression indicator reaches M bits.

The final object of the seventh and eighth steps is to obtain 128 bits of compression indicator. Thus, they are similar to the third and fourth steps as described above and the description thereof will be omitted here.

After obtaining the 128 bits of compression indicator, at the ninth step, the combined compression indicator is outputted to the memory.

In an embodiment of the present disclosure, the compression indicator is also obtained when the compressed data is obtained. Thus, the second to fifth steps can be preformed concurrently with the sixth to ninth steps. Herein, the second to fifth steps are described before the sixth to ninth steps for the purpose of illustration only. In fact, the present disclosure is not limited to any specific order in which they are performed.

Next, the process in which the Q processing units obtain the M bits of raw data as requested will be explained in detailed.

At step 1, the data processing interface receives a read data request outputted from the Q processing units for reading M bits of raw data.

At step 2, the data processing interface obtains and outputs to the memory a combined compression indicator associated with the M bits of raw data.

At step 3, the memory controller determines the compressed data associated with the M bits of raw data based on the combined compression indicator associated with the M bits of raw data.

At step 4, the memory controller outputs the compressed data associated with the M bits of raw data to the data processing interface.

At step 5, the data processing interface receives and decompresses the compressed data associated with the M bits of raw data to obtain raw data associated with the M bits of raw data.

At step 6, the data processing interface outputs the raw data associated with the M bits of raw data to the Q processing units.

In an implementation, when the Q data processing units need to process 128 bits of raw data, the Q data processing units will send a read data request to the data processing interface for reading 128 bits of raw data. The read data request contains a first address of the 128 bits of raw data in the Q data processing units and an offset indicating a position of the combined compression indicator associated with the 128 bits of raw data in the 128 bits of combined compression indicator in which the combined compression indicator is included.

After the data processing interface has received the read data request outputted from the Q processing units for reading the M bits of raw data, the process proceeds with the step 2 in which the data processing interface obtains and outputs to the memory a combined compression indicator associated with the M bits of raw data.

In an implementation, the data processing interface obtains the combined compression indicator associated with the M bits of raw data by obtaining M bits of combined compression indicator including the combined compression indicator associated with the 128 bits of raw data and then obtaining the combined compression indicator associated with the 128 bits of raw data based on the read data request.

In order to obtain the M bits of combined compression indicator including the combined compression indicator associated with the 128 bits of raw data rapidly and efficiently, the data processing interface can send the first address of the 128 bits of raw data in the Q data processing units as included in the read data request to a cache which stores data information that is read and written most frequently. The cache searches a storage structure for a first address label corresponding to the first address and, if the first address label is found, sends the M bits of combined compression indicator including the combined compression indicator associated with the 128 bits of raw data corresponding to the first address label to the data processing interface. If no first address label is found, the data processing interface sends the first address of the 128 bits of raw data in the Q data processing units as included in the read data request to the memory controller. The memory controller searches for the M bits of combined compression indicator including the combined compression indicator associated with the 128 bits of raw data corresponding to the first address and sending them to the data processing interface.

Of course, in order to improve the efficiency of searching in the cache, when the memory controller sends the M bits of combined compression indicator including the combined compression indicator associated with the 128 bits of raw data corresponding to the first address to the data processing interface, it also sends the first address and the M bits of combined compression indicator including the combined compression indicator associated with the 128 bits of raw data corresponding to the first address to the cache. The cache then allocates a first address label to the first address and the M bits of combined compression indicator including the combined compression indicator associated with the 128 bits of raw data corresponding to the first address. In this way, when the data processing interface sends the first address to the cache next time, the cache can find the address label corresponding to the first address rapidly and send the M bits of combined compression indicator including the combined compression indicator associated with the 128 bits of raw data corresponding to the first address label to the data processing interface.

After obtaining the M bits of combined compression indicator including the combined compression indicator associated with the 128 bits of raw data, the data processing interface can obtain the combined compression indicator associated with the 128 bits of raw data based on the offset in the read data request.

For example, when the data processing interface obtains 01101111 . . . 01 as the M bits of combined compression indicator including the combined compression indicator associated with the 128 bits of raw data and the offset indicates that the position of the combined compression indicator associated with the 128 bits of raw data in the M bits of combined compression indicator in which it is included is the first to eighth bits from left in the M bits of combined compression indicator in which it is included, it is determined that the combined compression indicator associated with the 128 bits of raw data is 01101111.

After obtaining the combined compression indicator associated with the M bits of raw data in the step 2, the process proceeds with the following steps.

At step 3, the memory controller determines the compressed data associated with the M bits of raw data based on the combined compression indicator associated with the M bits of raw data.

At step 4, the memory controller outputs the compressed data associated with the M bits of raw data to the data processing interface.

In an implementation, after the data processing interface obtains and outputs to the memory the combined compression indicator associated with the M bits of raw data, the memory controller determines the compressed data associated with the M bits of raw data based on the combined compression indicator associated with the M bits of raw data.

In the above example, after the data processing interface obtains and outputs to the memory 01101111 as the combined compression indicator associated with the M bits of raw data, the memory controller determines the 64 bits of compressed data, the 32 bits of compressed data, the 16 bits of compressed data plus the 16 bits of compressed data as the compressed data associated with the M bits of raw data based on the combined compression indicator of 01101111.

At step 5, the data processing interface receives and decompresses the compressed data associated with the M bits of raw data to obtain raw data associated with the M bits of raw data.

In the above example, after receiving the 64 bits of compressed data, the 32 bits of compressed data, the 16 bits of compressed data plus the 16 bits of compressed data as the compressed data associated with the M bits of raw data, the data processing interface decompresses the 64 bits of compressed data, the 32 bits of compressed data, the 16 bits of compressed data plus the 16 bits of compressed data to obtain the raw data associated with the 128 bits of raw data.

$2^{nd}$ Embodiment

According to an embodiment of the present disclosure, an information processing method is also provided based on the same inventive concept. The information processing method is applied in an electronic device and the principle of the solution of the information processing method is similar to that of the electronic device. Regarding the embodiment of the information processing method, reference can be made to the embodiment of the method and only differences between them will be explained here.

Figure 2:
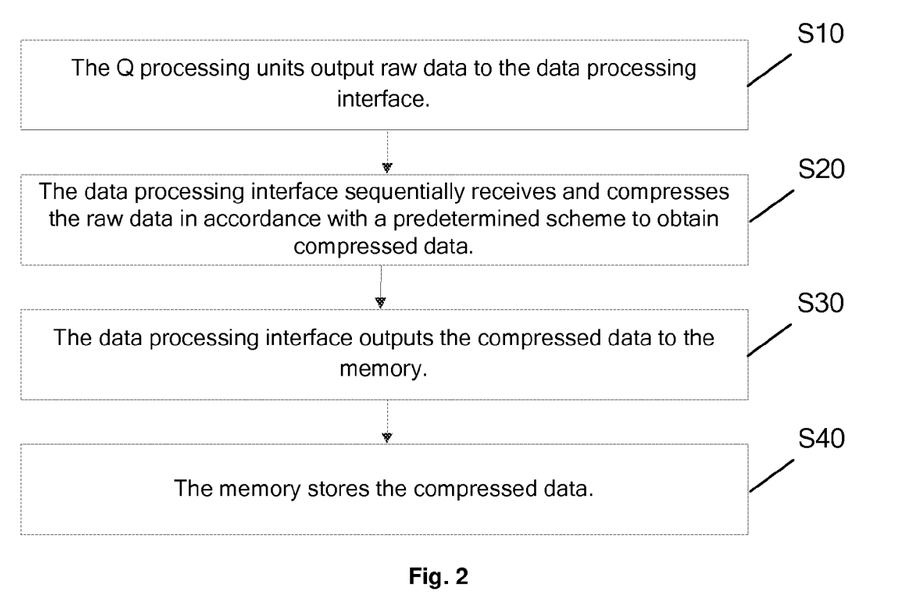
FIG. 2 is a flowchart illustrating an information processing method according to a second embodiment of the present disclosure.

As shown in FIG. 2, the information processing method is applied in an electronic device including: a processor comprising N processing units capable of processing data and performing data input and output operations, where N≥1; a data processing interface coupled to Q processing units among the N processing units, where 1≤Q≤N; and a memory coupled to the data processing interface. The method includes the following steps.

At step S10, the Q processing units output raw data to the data processing interface.

At step S20, the data processing interface sequentially receives and compresses the raw data in accordance with a predetermined scheme to obtain compressed data.

At step S30, the data processing interface outputs the compressed data to the memory.

At step S40, the compressed data is stored in the memory.

Optionally, the N processing units include at least an image processing unit, a video processing unit and/or a display processing unit.

Optionally, the data processing interface has an M bit of read/write bit width.

Optionally, the step S20 includes: receiving, by the data processing interface, M bits of raw data outputted sequentially from the Q processing units and compressing the M bits of raw data sequentially in accordance with a predetermined compression scheme to obtain compressed data and a compression indicator associated with the predetermined compression scheme; determining, by the data processing interface, whether the compressed data has reached M bits; obtaining, by the data processing interface, next compressed data associated with next M bits of raw data outputted sequentially from the Q processing units in the case that the compressed data has not reached M bits; combining, by the data processing interface, the obtained compressed data including the compressed data and the next compressed data sequentially until the combined compressed data reaches M bits; and outputting, by the data processing interface, the combined compressed data to the memory.

In particular, the method further includes, subsequent to the step S20: determining, by the data processing interface, whether the compression indicator has reached M bits; obtaining, by the data processing interface, a next compression indicator associated with next M bits of raw data outputted sequentially from the Q processing units in the case that the compression indicator has not reached M bits; combining, by the data processing interface, the obtained compression indicator including the compression indicator and the next compression indicator sequentially until the combined compression indicator reaches M bits; and outputting, by the data processing interface, the combined compression indicator to the memory.

In particular, the method further includes, subsequent to the step S40: receiving, by the data processing interface, a read data request outputted from the Q processing units for reading M bits of raw data; and obtaining and outputting to the memory, by the data processing interface, a combined compression indicator associated with the M bits of raw data.

In particular, the method further includes: subsequent to said obtaining and outputting to the memory, by the data processing interface, the combined compression indicator associated with the M bits of raw data: determining, by at least one memory controller, the compressed data associated with the M bits of raw to data based on the combined compression indicator associated with the M bits of raw data; and outputting, by the at least one memory controller, the compressed data associated with the M bits of raw data to the data processing interface, wherein the at least one memory controller is provided in the memory.

In particular, the method further includes: subsequent to said outputting, by the at least one memory controller, the compressed data associated with the M bits of raw data to the data processing interface: receiving and decompressing, by the data processing interface, the compressed data associated with the M bits of raw data to obtain raw data associated with the M bits of raw data; and outputting, by the data processing interface, the raw data associated with the M bits of raw data to the Q processing units.

According to the embodiments of the present disclosure:

First, the electronic device is capable of reducing the amount of data exchanged between the processor and the memory outside the processor and the memory. In this way, the power consumption and the cost of the electronic device can be reduced and the performance of the electronic device can be improved.

Second, the data processing interface can decompress the compressed data to obtain the raw data based on the compressed data and the compression indicator associated with the compressed data. The data processing interface can combine each of the compressed data and the compression indicator into M bits, i.e., the read/write bit width of the data processing interface, before outputting to the memory. Thus, the data processing interface is sufficiently utilized to reduce the amount of data exchanged between the processor and the memory.

Third, it can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage medium (including, but not limited to, magnetic disk storage, CD-ROM, optical storage) containing computer readable program codes.

The present disclosure have been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In particular, an information processing method according to an embodiment of the present disclosure is applied in an electronic device. The electronic device includes: a processor comprising N processing units each capable of processing data and performing data input and output operations, where $N \geq 1$; a data processing interface coupled to Q processing units among the N processing units, where $1 \leq Q \leq N$; and a memory coupled to the data processing interface. The computer program instructions for implementing the information processing method according to the embodiment of the present disclosure can be stored on a storage medium such as an optical disc, a hard disk or a flash memory. The computer program instructions stored in the storage medium for implementing the information processing method include, when read or executed by an electronic device, the following steps of: outputting, by the Q processing units, raw data to the data processing interface; receiving, by the data processing interface, and sequentially compressing the raw data in accordance with a predetermined scheme to obtain compressed data; outputting, by the data processing interface, the compressed data to the memory; and storing the compressed data in the memory.

Optionally, the N processing units include at least an image processing unit, a video processing unit and/or a display processing unit.

Optionally, the data processing interface has a read/write bit width of M bits.

Optionally, the computer program instructions stored in the storage medium for sequentially compressing the raw data in accordance with the predetermined scheme include, when executed: receiving, by the data processing interface, M bits of raw data outputted sequentially from the Q processing units and compressing the M bits of raw data sequentially in accordance with a predetermined compression scheme to obtain compressed data and a compression indicator associated with the predetermined compression scheme; determining, by the data processing interface, whether the compressed data has reached M bits; obtaining, by the data processing interface, next compressed data associated with next M bits of raw data outputted sequentially from the Q processing units in the case that the compressed data has not reached M bits; combining, by the data processing interface, the obtained compressed data including the compressed data and the next compressed data sequentially until the combined compressed data reaches M bits; and outputting, by the data processing interface, the combined compressed data to the memory.

Optionally, the computer program instructions stored in the storage medium include, when executed subsequent to said sequentially compressing the raw data in accordance with the predetermined scheme: determining, by the data processing interface, whether the compression indicator has reached M bits; obtaining, by the data processing interface, a next compression indicator associated with next M bits of raw data outputted sequentially from the Q processing units in the case that the compression indicator has not reached M bits; combining, by the data processing interface, the obtained compression indicator including the compression indicator and the next compression indicator sequentially until the combined compression indicator reaches M bits; and outputting, by the data processing interface, the combined compression indicator to the memory.

Optionally, the computer program instructions stored in the storage medium include, when executed subsequent to said storing the compressed data in the memory: receiving, by the data processing interface, a read data request outputted from the Q processing units for reading M bits of raw data; and obtaining and outputting, by the data processing interface, to the memory a combined compression indicator associated with the M bits of raw data.

Optionally, the computer program instructions stored in the storage medium for include, when executed subsequent to said obtaining and outputting, by the data processing interface, to the memory the combined compression indicator associated with the M bits of raw data: determining, by at least one memory controller, the compressed data associated with the M bits of raw data based on the combined compression indicator associated with the M bits of raw data; and outputting, by the at least one memory controller, the compressed data associated with the M bits of raw data to the data processing interface, wherein the at least one memory controller is provided in the memory.

Optionally, the computer program instructions stored in the storage medium include, when executed subsequent to said outputting, by the at least one memory controller, the compressed data associated with the M bits of raw data to the data processing interface: receiving and decompressing, by the data processing interface, the compressed data associated with the M bits of raw data to obtain raw data associated with the M bits of raw data; and outputting, by the data processing interface, the raw data associated with the M bits of raw data to the Q processing units.

While the preferred embodiments of the present application have been described above, various modifications and alternatives to these embodiments can be made by those skilled in the art based on the fundamental inventive concept. Therefore, these preferred embodiments and all the modifications and alternatives falling within the scope of the present application are to be encompassed by the claims as attached.

Obviously, various modifications and alternatives can be made to the present application by those skilled in the art without departing from the spirit and scope of the present application. Therefore, these modifications and alternatives are to be encompassed by the present application if they fall within the scope of the claims and their equivalents.

What is claimed is:

1. An electronic device, comprising:
a processor, which comprises N processing units to process data and perform data input and output;
a data processing interface coupled to Q processing units among the N processing units, which compresses raw data received from the Q processing units to obtain compressed data, wherein $1 \leq Q \leq N$; and
a memory coupled to the data processing interface, which receives and stores the compressed data;
wherein the data processing interface further
receives M bits of raw data outputted sequentially from the Q processing units;
compresses the M bits of raw data sequentially in accordance with a predetermined compression scheme;
obtains the i-th compressed data and a compression indicator associated with the compression scheme for the i-th compressed data;
determines whether the compression indicator has reached M bits;
obtains a next compression indicator associated with next M bits of raw data outputted sequentially from the Q processing units, in the case that the compression indicator has not reached M bits;
combines the obtained compression indicator and the next compression indicator sequentially until the combined compression indicator reaches M bits; and
outputs the combined compression indicator to the memory.

2. The electronic device of claim 1, wherein the N processing units comprise at least an image processing unit, a video processing unit and/or a display processing unit.

3. The electronic device of claim 1, wherein the data processing interface has a read/write bit width of M bits.

4. The electronic device of claim 3, wherein the data processing interface further:
determines whether the compressed data has reached M bits;
obtains the (i+1)-th compressed data associated with next M bits of raw data outputted sequentially from the Q processing units, in the case that the compressed data has not reached M bits;
combines the compressed data sequentially until the combined compressed data reaches M bits; and
outputs the combined compressed data to the memory.

5. The electronic device of claim 1, wherein the data processing interface further:
receives a read data request outputted from the Q processing units for reading M bits of raw data; and
obtains a combined compression indicator associated with the M bits of raw data, and outputs the combined compression indicator to the memory.

6. The electronic device of claim 5, wherein the memory comprises at least one memory controller to:
determine the compressed data associated with the M bits of raw data, according to the combined compression indicator associated with the M bits of raw data; and
output the compressed data associated with the M bits of raw data to the data processing interface.

7. The electronic device of claim 6, wherein the data processing interface further:
receives and decompresses the compressed data associated with the M bits of raw data, to obtain raw data associated with the M bits of raw data; and
outputs the raw data associated with the M bits of raw data to the Q processing units.

8. An information processing method, comprising:
outputting, by Q processing units among N processing units, raw data to a data processing interface, wherein $1 \leq Q \leq N$;
receiving and sequentially compressing, by the data processing interface, the raw data in accordance with a predetermined scheme to obtain compressed data;
outputting, by the data processing interface, the compressed data to a memory; and
storing the compressed data in the memory;
wherein said sequentially compressing the raw data in accordance with the predetermined scheme comprises: receiving, by the data processing interface, M bits of raw data outputted sequentially from the Q processing units, and compressing the M bits of raw data sequentially in accordance with a predetermined compression scheme to obtain the i-th compressed data and a compression indicator associated with the compression scheme for the i-th compressed data;
wherein subsequent to said sequentially compressing the raw data in accordance with the predetermined scheme, the method further comprises: determining, by the data processing interface, whether the compression indicator has reached M bits; obtaining, by the data processing interface, a next compression indicator associated with next M bits of raw data outputted sequentially from the Q processing units, in the case the compression indicator has not reached M bits; combining, by the data processing interface, the obtained compression indicator and the next compression indicator sequentially until the combined compression indicator reaches M bits; and outputting, by the data processing interface, the combined compression indicator to the memory.

9. The method of claim 8, wherein the N processing units comprise at least an image processing unit, a video processing unit and/or a display processing unit.

10. The method of claim 8, wherein the data processing interface has a read/write bit width of M bits.

11. The method of claim 10, wherein said sequentially compressing the raw data in accordance with the predetermined scheme comprises:
- determining, by the data processing interface, whether the compressed data has reached M bits;
- obtaining, by the data processing interface, the (i+1)-th compressed data associated with next M bits of raw data outputted sequentially from the Q processing units, in the case that the compressed data has not reached M bits;
- combining, by the data processing interface, the compressed data sequentially until the combined compressed data reaches M bits; and
- outputting, by the data processing interface, the combined compressed data to the memory.

12. The method of claim 8, wherein subsequent to said storing the compressed data in the memory, the method further comprises:
- receiving, by the data processing interface, a read data request outputted from the Q processing units for reading M bits of raw data; and
- obtaining, by the data processing interface, a combined compression indicator associated with the M bits of raw data; and outputting the combined compression indicator to the memory.

13. The method of claim 12, wherein subsequent to said obtaining and outputting the combined compression indicator to the memory, the method further comprises:
- determining, by at least one memory controller of the memory, the compressed data associated with the M bits of raw data, according to the combined compression indicator associated with the M bits of raw data; and
- outputting, by the at least one memory controller, the compressed data associated with the M bits of raw data to the data processing interface.

14. The method of claim 13, wherein subsequent to said outputting the compressed data associated with the M bits of raw data to the data processing interface, the method further comprises:
- receiving and decompressing, by the data processing interface, the compressed data associated with the M bits of raw data, to obtain raw data associated with the M bits of raw data; and
- outputting, by the data processing interface, the raw data associated with the M bits of raw data to the Q processing units.

* * * * *